Patented Sept. 25, 1928.

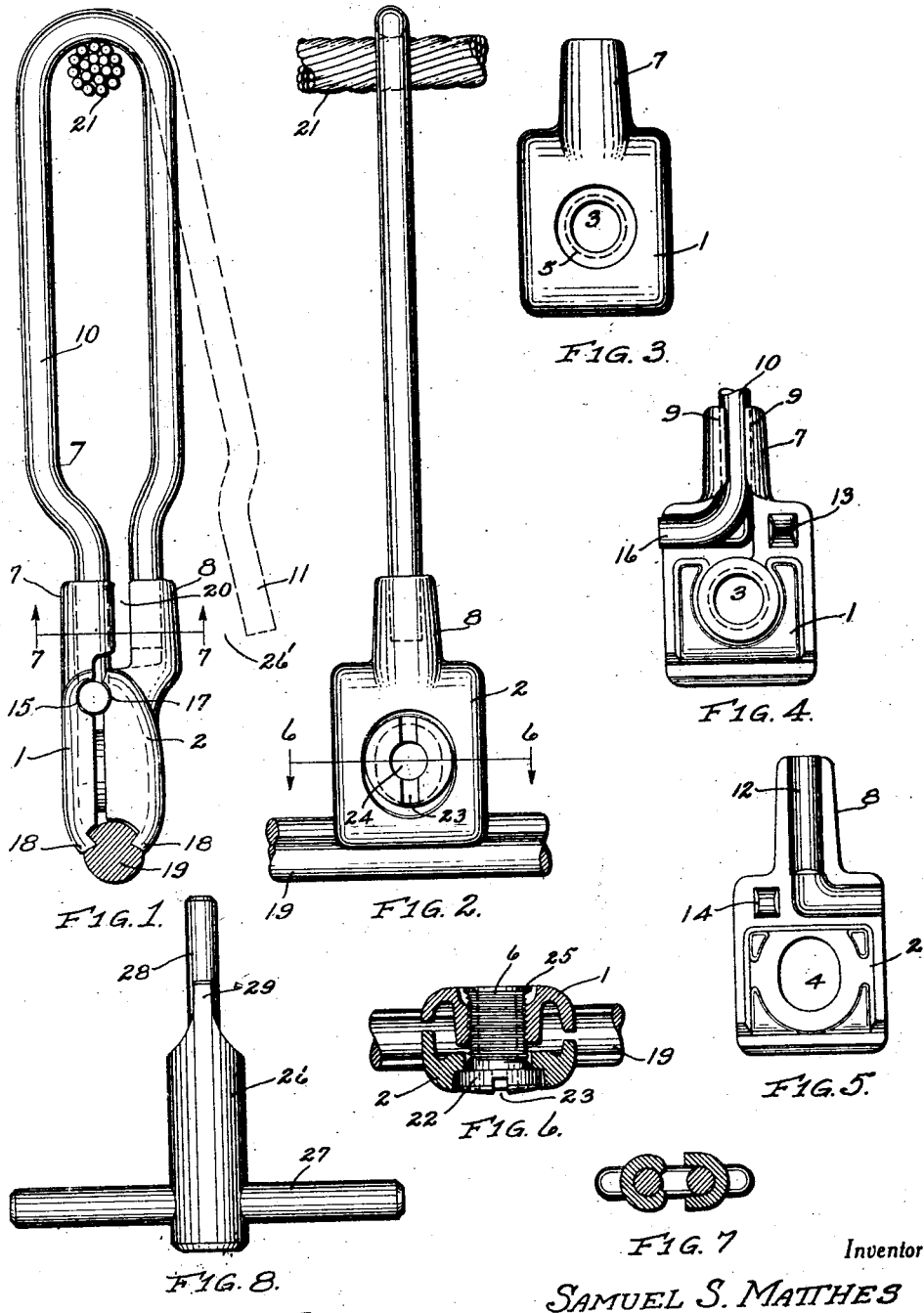

1,685,431

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

TROLLEY-WIRE CLAMP.

Application filed September 7, 1927. Serial No. 217,939.

My invention relates to hangers for conductors and particularly trolley conductors or wires suspended from a catenary cable.

The object of my invention is to provide a simple and efficient hanger which can be applied to the messenger or catenary cable without disassembling the parts to be applied to the messenger or catenary cable and to the trolley wire without being disassembled, and which can also be applied to the trolley wire temporarily prior to the tensioning of the trolley wire and permanently securing the clamp or hanger to the wire.

In the drawing accompanying this specification:

Fig. 1 shows a side view of my invention as applied to a catenary cable and a trolley wire and with the hanger member in position to receive the messenger cable, as shown by dotted lines.

Fig. 2 is a face view of Fig. 1.

Fig. 3 is a face view of the left hand clamping member shown in Fig. 1.

Fig. 4 is an inner face view of Fig. 3.

Fig. 5 is an inner face view of the right hand clamping member shown in Fig. 1.

Fig. 6 is a sectional view on the line 6—6 of Fig. 2.

Fig. 7 is a sectional view on the line 7—7 of Fig. 1.

Fig. 8 shows one view of a tool used for permanently securing the device to the trolley wire.

In the preferred embodiment of my invention I employ two clamping members 1 and 2 provided with registering orifices 3 and 4 respectively. The orifice 3 is provided with a thread 5 to engage and interlock with the special screw 6. The orifice 4 is without thread and is elliptical in shape to permit of adjustment of the members 1 and 2 relative to each other in positioning the device upon a trolley wire.

The members 1 and 2 are provided with projecting lugs 7 and 8 respectively.

The inner surfaces of the lugs 7 and 8 are concave and the edges of the lug 7 are provided with lips 9 adapted to be formed about the suspension member 10. The inner face of the lug 8 is left concave to detachably receive the lower end 11 of the suspension member 10, and the side walls form a groove 12 which retains the end 11 of the member 10 in position against lateral displacement in line with the trolley wire.

The member 1 is provided with a recess 13 to receive a projecting lug 14 on the member 2, which helps to movably maintain the members 1 and 2 against lateral and rotative movement relative to each other. The member 1 is provided with a groove 15 to receive the bent end 16 of the member 10. This bent end 16 coacts with a groove 17 on the member 2, which tends to lock the parts together, as well as the recess and lug 13 and 14.

The screw 6 is constructed with a large diameter to pass through the orifices in the members 1 and 2, and the outer surface is threaded to engage with the threads 5 on the member 1. The threaded portion of the screw 6 is made sufficiently long so that when it is backed off it will permit the members 1 and 2 to separate sufficiently to allow the end 11 of the member 10 to be sprung out of position, as shown by the dotted lines in Fig. 1, and also to permit the trolley wire to be placed in position between the lips 18. When the screw 6 is drawn up tight, the members 1 and 2 are drawn into close relation with each other and with the trolley wire 19 and the end 11 of the member 10 is held in the groove 12 and the space 20 is such that the member 11 cannot pass between the lugs 7 and 8. When the end 11 is sprung out, as shown by the dotted lines in Fig. 1, the member 10 can be placed in position upon the messenger cable 21. When the parts 1 and 2 are separated by unscrewing the member 6 sufficiently, the space 20 is then greater than the diameter of the member 11.

The screw 6 is provided with a large head 22, and the head is provided with a wide and substantial slot 23. Passing axially through the screw 6 is an orifice 24. After the screw has been positioned with relation to the members 1 and 2, I turn the extreme end of the shank over, as at 25, which prevents the screw being entirely removed from the clamps and thereby dropped when the lineman is adjusting the clamp to the trolley wire and catenary cable.

My invention is applied to the messenger wire by running the screw 6 back until the members 1 and 2 separate so as to spring the end 11 of the member 10 out of its socket, as shown by the dotted lines in Fig. 1. This permits the hanger to be applied to the messenger cable 21 by passing the cable through the space 26' between the lug 8 and the end 11 of the member 10.

The trolley wire 11 can also be positioned between the jaws 18. This being accomplished, the end 11 of the member 10 can be placed back in position in the groove 12 and the tendency for the end 11 to spring outwardly will cause the members 1 and 2 to pivot relative to each other upon the screw 6, thereby throwing the jaws 18 inwardly and in gripping relation with the trolley wire 19, and this will hold the trolley wire temporarily between the jaws 1 and 2. The screw 6 can now be tightened up or this operation can be left until some future time if desired.

The member 10 can be made of steel, phosphor bronze or hard drawn copper. If made of steel or phosphor bronze, the resiliency or spring action of the end 11 is quite strong. The co-action of the end 16 with the grooves 15 and 17 on the members 1 and 2 respectively prevents relative rotation of the member 10 with respect to the clamping members. Such rotation would take place whenever the member 10 is made of round material, unless it were for the co-action of the end 15 as stated.

In Fig. 8 I show a tool for tightening the screw 6, which consists of a body member 26 and a handle 27. A projecting cylindrical member 28 projects from the opposite end of the handle and is of such a diameter as to fit reasonably close in the orifice 24 in the screw. The tool is also provided with oppositely disposed members 29 to engage the slot 23. This tool is found very efficient for use with a screw of the nature shown, for the reason that the member 28 positioned in the orifice 24 prevents the tool from slipping out of position relative to the screw tightening it up, as is often the case with an ordinary screw driver made to fit merely the slot in a screw. A tool of this character is far superior to a screw driver, as the operator is able to work with more confidence and less danger to his hands than if he were using a screw driver, which, if it did slip, would be apt to injure his hand.

Having described my invention, I claim:

1. A trolley wire clamp comprising a pair of clamping members, a groove in each member to receive the ends of a suspension member and one end of the suspension member permanently secured in one of the grooves, means detachably holding the other end of the suspension member, jaws on the lower edges of the clamping members to grip the trolley wire, securing means to draw the clamping members together and into contact with the trolley wire, enlarged integral means on each end of the securing means to prevent withdrawal of the securing means and coacting means on the clamping members to prevent relative rotation of the clamping members when the securing means is partially withdrawn.

2. A trolley wire clamp comprising a pair of clamping members, a U shaped suspension member having one end permanently secured to one clamping member and the other end detachably engaging the other clamping member, securing means to draw the clamping members into clamping relation with the trolley wire, means to limit the withdrawal of the securing means and means to prevent relative rotation of the clamping members when said securing means is partially withdrawn.

3. A trolley wire clamp comprising a pair of clamping members having jaws to grip a trolley wire, a U shaped resilient suspension member having one end secured to one of said members and the other end detachably interlocked with the other clamping member, securing means to pivotally hold the clamping members together, means to limit the withdrawal of the securing means from the clamping members, means to prevent the relative rotation of the clamping members when the securing means is withdrawn to its limit and means on the fixed end of the suspension member to engage both clamping members to assist in preventing relative rotation of the clamping and suspension members.

4. A trolley wire clamp comprising a pair of clamping members, each having a jaw to grip a trolley wire and an upwardly projecting member with a seat therein, a U shaped suspension member having one end secured in one seat and the other end detachably positioned in said seat and removable therefrom to apply the clamp to a suspension cable, means to draw the clamping members together and grip the wire, adjacent edges of the projecting members being so related that when the clamping members are gripping the wire the detachable end cannot be removed distant from its seat but when the clamping members are out of gripping relation with the wire a predetermined amount the detachable end can be removed distantly from its seat.

5. A trolley wire support comprising a pair of clamping members each having a jaw to grip a trolley wire, a suspension member nondetachably secured to one of the clamping members and a screw to draw the clamping members into clamping relation with the wire comprising a threaded shank to threadably engage one clamping member and a head at one end of the shank of greater diameter than the shank and engaging the other clamping member, an orifice of circular section extending axially of the head and shank from the head end and a transverse slot in the outer face of the head.

6. A trolley wire support comprising a pair of clamping members each having a jaw to grip a trolley wire, a suspension member for the clamping members having a permanent connection to one clamping member and a detachable engagement with the other clamping member and a screw to draw the clamping members into clamping relation with the wire comprising a threaded shank to threadably engage one clamping member and a head at one end of the shank of greater diameter than the shank and engaging the other clamping member, an orifice extending axially of the head and shank and a transverse slot in the outer face of the head and means on the end of the shank opposite the head to engage with one of the clamping members to limit the withdrawal of the screw and means to prevent relative rotation of the clamping members when the securing means is partially withdrawn.

7. A trolley wire clamp comprising a pair of clamping members having registering openings and a counterbore in the face of one member and registering with the opening therein, a screw having a threaded engagement with one member and a head positioned in the counter-bore, a passage extending from the face of the head inwardly and having a smooth bore and a plurality of slots radiating from the bore outwardly in the face of the head, a U-shaped suspension means to attach the clamping member to a support and having one end permanently secured to one clamping member and the other end detachably engaging the other clamping member and means to grip a trolley wire.

8. A trolley wire clamp comprising a pair of clamping members pivotally secured together when in position to receive a trolley wire, means along one edge of each member to grip the wire, means to move the members into gripping relation with the wire and a resilient supporting member associated with each clamping member to secure the device to a support and move the members into holding engagement with the trolley wire, one end of the resilient supporting means secured to one clamping member and the other end of the supporting means to removably engage the other clamping member and means to prevent relative rotation of the clamping members in their released position.

In testimony whereof I affix my signature.

SAMUEL S. MATTHES.